(12) United States Patent
Martinez

(10) Patent No.: US 7,512,573 B2
(45) Date of Patent: Mar. 31, 2009

(54) OPTICAL PROCESSOR FOR AN ARTIFICIAL NEURAL NETWORK

(75) Inventor: John C. Martinez, Dunstable, MA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 344 days.

(21) Appl. No.: 11/549,699

(22) Filed: Oct. 16, 2006

(65) Prior Publication Data

US 2008/0154815 A1    Jun. 26, 2008

(51) Int. Cl.
G06E 1/00 (2006.01)
G06E 3/00 (2006.01)
G06F 15/18 (2006.01)
G06G 7/00 (2006.01)
G06N 3/02 (2006.01)

(52) U.S. Cl. ...................................... 706/15
(58) Field of Classification Search .................. None
See application file for complete search history.

(56) References Cited

U.S. PATENT DOCUMENTS

| | | | | |
|---|---|---|---|---|
| 4,620,293 A | * | 10/1986 | Schlunt et al. | 708/839 |
| 4,843,587 A | * | 6/1989 | Schlunt et al. | 708/835 |
| 5,164,913 A | * | 11/1992 | Guilfoyle et al. | 708/191 |
| 5,274,385 A | * | 12/1993 | Riza | 342/375 |
| 5,400,038 A | * | 3/1995 | Riza et al. | 342/375 |
| 5,867,264 A | * | 2/1999 | Hinnrichs | 356/310 |
| 5,920,536 A | * | 7/1999 | Campbell et al. | 369/103 |
| 6,128,109 A | * | 10/2000 | Jenkins et al. | 359/11 |
| 6,163,378 A | * | 12/2000 | Khoury | 356/457 |
| 6,208,398 B1 | * | 3/2001 | Scherer et al. | 349/124 |
| 6,248,487 B1 | * | 6/2001 | Cohn et al. | 430/30 |
| 6,421,163 B1 | * | 7/2002 | Culver et al. | 359/279 |
| 6,445,470 B1 | * | 9/2002 | Jenkins et al. | 359/11 |
| 6,504,943 B1 | * | 1/2003 | Sweatt et al. | 382/103 |
| 6,529,614 B1 | * | 3/2003 | Chao et al. | 382/103 |
| 6,697,180 B1 | * | 2/2004 | Wilson et al. | 359/11 |
| 6,879,427 B2 | * | 4/2005 | Mendlovic et al. | 359/279 |
| 6,922,233 B2 | * | 7/2005 | Riza | 356/121 |
| 7,001,020 B2 | * | 2/2006 | Yancey et al. | 351/221 |

(Continued)

OTHER PUBLICATIONS

Vortex Generation and Pixel Calibration Using a Spatial Light Modulator for Maskless Lithography Woong Jung; Jen-Shiang Wang; Solgaard, O.; Optical MEMS and Nanophotonics, 2007 IEEE/LEOS International Conference on Aug. 12, 2007-Jul. 16, 2007 pp. 147-148 Digital Object Identifier 10.1109/OMEMS.2007.4373883.*

(Continued)

Primary Examiner—Michael B Holmes

(57) ABSTRACT

An optical processor adapted to emulate an artificial neural network (ANN) having a plurality of interconnected layers, each layer having one or more artificial neurons, the processor having a spatial light modulator (SLM) optically coupled, via an optical mask, to a photodetector array. In one embodiment, the SLM has a plurality of pixels, each pixel being configurable to emulate an output portion of a corresponding artificial neuron in a signal-sending ANN layer. The optical mask has a hologram that encodes the weights corresponding to interlayer connections in the ANN and spatially modulates the light transmitted by the SLM. The photodetectors of the array spatially resolve the interference pattern produced by the spatially modulated light, with each photodetector being configurable to emulate an input portion of a corresponding artificial neuron in a signal-receiving ANN layer.

20 Claims, 6 Drawing Sheets

U.S. PATENT DOCUMENTS

| | | | | |
|---|---|---|---|---|
| 7,092,079 | B2* | 8/2006 | Riza et al. | 356/121 |
| 7,164,117 | B2* | 1/2007 | Breed et al. | 250/221 |
| 7,243,945 | B2* | 7/2007 | Breed et al. | 280/735 |
| 7,292,516 | B1* | 11/2007 | Xavier da Silveira et al. | 369/103 |
| 7,407,029 | B2* | 8/2008 | Breed et al. | 180/274 |
| 7,411,872 | B1* | 8/2008 | Xavier da Silveira | 369/44.11 |
| 7,415,126 | B2* | 8/2008 | Breed et al. | 382/100 |

OTHER PUBLICATIONS

Study on a lateral-electrical-field pixel architecture for FLC spatial light modulator with continuously tunable grayscales Min Jiang; Bing Yang; Tianyi Zhang; Lijiu Ji; Yangyuan Wang; Electron Devices, IEEE Transactions on vol. 50, Issue 7, Jul. 2003 pp. 1694-1697 Digital Object Identifier 10.1109/TED.2003.814978.*

Smart spatial light modulators using liquid crystals on silicon Johnson, K.M.; McKnight, D.J.; Underwood, I.; Quantum Electronics, IEEE Journal of vol. 29, Issue 2, Feb. 1993 pp. 699-714 Digital Object Identifier 10.1109/3.199323.*

Equalization of modal dispersion in multimode fiber using spatial light modulators Alon, E.; Stojanovic, V.; Kahn, J.M.; Boyd, S.; Horowitz, M.; Global Telecommunications Conference, 2004. Globecom '04. IEEE vol. 2, Nov. 29-Dec. 3, 2004 pp. 1023-1029 vol. 2 Digital Object Identifier 10.1109/Glocom.2004.1378113.*

Packaging of high resolution Si based spatial light modulators for display applications Narayan, C.; Horton, R.; Electronics Manufacturing Technology Symposium, 1999. Twenty-Fourth IEEE/CPMT Oct. 18-19, 1999 pp. 402-409 Digital Object Identifier 10.1109/IEMT.1999.804852.*

Multi-channel non-blocking holographic switching with a ferroelectric liquid crystal spatial light modulator Yamazaki, H.; Yamaguchi, M.; Hirabayashi, K.; Fukushima, S.; Ito, T.; Lasers and Electro-Optics Society Annual Meeting, 1993. LEOS '93 Conference Proceedings. IEEE Nov. 15-18, 1993 pp. 492-493.*

A Projection System for Real World Three-Dimensional Objects Using Spatial Light Modulators Gopinathan, U.; Monaghan, D.S.; Hennelly, B.M.; McElhinney, C.P.; Kelly, D.P.; McDonald, J.B.; Naughton, T.J.; Sheridan, J.T.; Display Technology, Journal of vol. 4, Issue 2, Jun. 2008 pp. 254-261 Digital Object Identifier 10.1109/JDT.2007.913943.*

Flat-surface magneto-optic spatial light modulator Park, J.H.; Takagi, H.; Cho, J.K.; Nishimura, K.; Uchida, H.; Inoue, M.; Magnetics Conference, 2003. INTERMAG 2003. IEEE International Mar. 28-Apr. 3, 2003 pp. GT-02 Digital Object Identifier 10.1109/INTMAG.2003.1230873.*

* cited by examiner

100

200

300

330

600

700

772

OPTICAL PROCESSOR FOR AN ARTIFICIAL NEURAL NETWORK

BACKGROUND OF THE INVENTION

1. Field of the Invention

The present invention relates to artificial neural networks and, more specifically, to an optical processing unit that can be used to emulate such networks.

2. Description of the Related Art

An artificial neural network (ANN) is an information processing paradigm that is inspired by the way biological nerve systems, such as the brain, process information. An information processing system based on this paradigm can be composed of a large number of interconnected processing elements (artificial neurons) working together to solve specific problems. Similar to people, ANNs can learn by example. As such, an ANN can be configured for a specific application, e.g., pattern recognition or data classification, through a learning process, which involves appropriate adjustments of synaptic connections between different neurons and/or decision making in the neuron core.

FIG. 1 schematically shows a simple artificial neuron (SAN) 100 of the prior art, two or more instances of which can be arranged to form an ANN having one or more layers, each layers having one or more neurons. SAN 100 has a neuron core 102, which receives multiple inputs labeled MODE, REF, and X1-Xn and generates one output. SAN 100 has two modes of operation, the training mode and the processing mode, controlled by a signal received via input MODE. In the training mode, for each pattern in a plurality of training patterns received at inputs X1-Xn, neuron core 102 is trained to fire (or not), i.e., to generate a binary "1" (or "0") at the output, by memorizing the corresponding binary values received at input REF. In the processing mode, when a taught input pattern is detected by neuron core 102 at inputs X1-Xn, the corresponding binary value memorized by the neuron core during the training mode appears at the output. However, if the input pattern received by neuron core 102 at inputs X1-Xn is not found among the training patterns, the neuron core uses a "firing rule" to determine whether to fire or not.

One firing rule that can be used in neuron core 102 is based on Hamming distance. More specifically, first, neuron core 102 sorts the training patterns into two sets, the first set having the training patterns, for which the neuron core has been instructed to fire, and the second set having the training patterns, for which the neuron core has been instructed not to fire. Next, for an input pattern not found in either set, neuron core 102 finds one training pattern from each of the two sets, for which training pattern the input pattern has most input values (X1-Xn) in common. In mathematical terms, neuron core 102 finds the shortest Hamming distance from the input pattern to each set. Then, neuron core 102 compares these two Hamming distances to determine which one of the two is shorter. Finally, neuron core 102 outputs a binary value equal to that of the set having the shorter of the two Hamming distances or, alternatively, remains undecided (generates an error) in the case of two equal Hamming distances. Thus, by applying the firing rule, neuron core 102 is able to generalize the training patterns, which enables SAN 100 to respond "sensibly" to all input patterns received in the processing mode, rather than responding only to the input patterns previously seen in the training mode.

FIG. 2 schematically shows a McCulloch-Pitts artificial neuron (MCPAN) 200 of the prior art. MCPAN 200 is generally similar to SAN 100. However, one difference between SAN 100 and MCPAN 200 is that, in the latter, the input signals received at inputs X1-Xn are weighted in weighting blocks 204-1 . . . 204-n before they are applied to a neuron core 202 of MCPAN 200. As a result, the effect of each input X1-Xn on the decision-making process in neuron core 202 depends on the weight assigned to that input in the respective weighting block 204. Another difference between SAN 100 and MCPAN 200 is that the latter uses a different firing rule than that used in the former. More specifically, neuron core 202 is configured to fire only if the sum ($\sigma$) of weighted inputs reaches or exceeds a predetermined threshold value, as expressed by Eq. (1):

$$\sigma \equiv \sum_{i=1}^{n} W_i x_i \geq T_0 \qquad (1)$$

where $W_i$ is the weight applied in weighting block 204-$i$, $x_i$ is the value received at input Xi, and $T_0$ is the threshold value. Note that, because neuron core 202 operates on real values, signal values received at inputs X1-Xn of MCPAN 200 are no longer limited to binary values. As such, the inputs of MCPAN 200 can be coupled to the outputs of different artificial neurons generating different (e.g., analog as opposed to digital binary) signal amplitudes at their respective outputs when they fire.

The use of input weights in MCPAN 200 gives that artificial neuron the ability to adapt to a particular situation, e.g., by changing the weights and/or threshold. This adaptation can be carried out during a training session, which can employ, e.g., one or more known-in-the-art neuron-adaptation algorithms. For example, the two most widely used algorithms are the Delta rule and the back-error propagation method. The former is often used in feed-forward ANNs, while the latter is preferred in feedback ANNs. After the adaptation is completed, the weights are normally fixed for further use in the processing mode.

An ANN having SANs 100 or MCPANs 200 is typically realized using a central processing unit (CPU) of a conventional computer. More specifically, the CPU emulates the ANN, i.e., uses a mathematical model of the ANN, as opposed to having a corresponding (massively parallel) physical structure. As a result, instead of the parallel signal processing inherent to neural networks, the computer emulating the ANN serially computes the response of one artificial neuron at a time. Disadvantageously, this serial processing causes the emulated ANN to have a relatively slow processing speed.

SUMMARY OF THE INVENTION

Problems in the prior art are addressed by various embodiments of an optical processor adapted to emulate an artificial neural network (ANN) having a plurality of interconnected layers, each layer having one or more artificial neurons, the processor having a spatial light modulator (SLM) optically coupled, via an optical mask, to a photodetector array. In one embodiment, the SLM has a plurality of pixels, each pixel being configurable to emulate an output portion of a respective artificial neuron in a signal-sending ANN layer and having an optical window, which is adapted to become either substantially transparent or substantially opaque based on the putative output of the artificial neuron whose output portion is being emulated. In the transparent state, the optical window transmits a laser pulse toward the photodetector array. In the opaque state, the optical window blocks the laser pulse. The optical mask comprises a hologram that encodes the weights corresponding to interlayer connections in the ANN and spatially modulates the light transmitted by the SLM using this hologram. The photodetector array spatially resolves the interference pattern produced by the spatially modulated light, with each photodetector in the array being configurable to emulate an input portion of a corresponding artificial neuron in a signal-receiving ANN layer. Light intensity measured by each photodetector is compared with a respective threshold value representing the firing threshold for the artificial neuron whose input portion is being emulated by the photodetector to determine a putative output for that artificial neuron. Advantageously over neuron-by-neuron processing of computer emulated ANNs, embodiments of an optical processor of the invention can perform layer-by-layer processing of signal propagation in the ANN being emulated, which results in a corresponding increase of the processing speed.

According to one embodiment, the present invention is an apparatus comprising: (i) an SLM having a plurality of pixels, each pixel being configurable to direct or not to direct light toward a photodetector array; (ii) an optical mask adapted to subject to spatial modulation the light directed by the SLM toward the photodetector array; and (iii) the photodetector array adapted to measure an interference pattern produced by the spatially modulated light.

According to another embodiment, the present invention is a method of signal processing comprising: (i) selectively directing light toward a photodetector array using a plurality of pixels in an SLM; (ii) spatially modulating the light directed by the SLM toward the photodetector array using an optical mask; and (iii) measuring an interference pattern produced by the spatially modulated light using the photodetector array.

According to yet another embodiment, the present invention is a method of emulating an ANN having a plurality of interconnected layers, each layer having one or more artificial neurons, the method comprising: (i) based on one or more outputs of one or more artificial neurons in a first selected layer of the ANN, configuring one or more pixels of a first selected section of a spatial light modulator (SLM) to direct or not to direct light toward a photodetector array; (ii) subjecting the light directed toward the photodetector array by the one or more so configured pixels to spatial modulation using an optical mask; and (iii) spatially resolving an interference pattern produced by the spatially modulated light at the photodetector array to determine one or more outputs of one or more artificial neurons in a next layer of the ANN.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Optical Processor

Figure 3A:
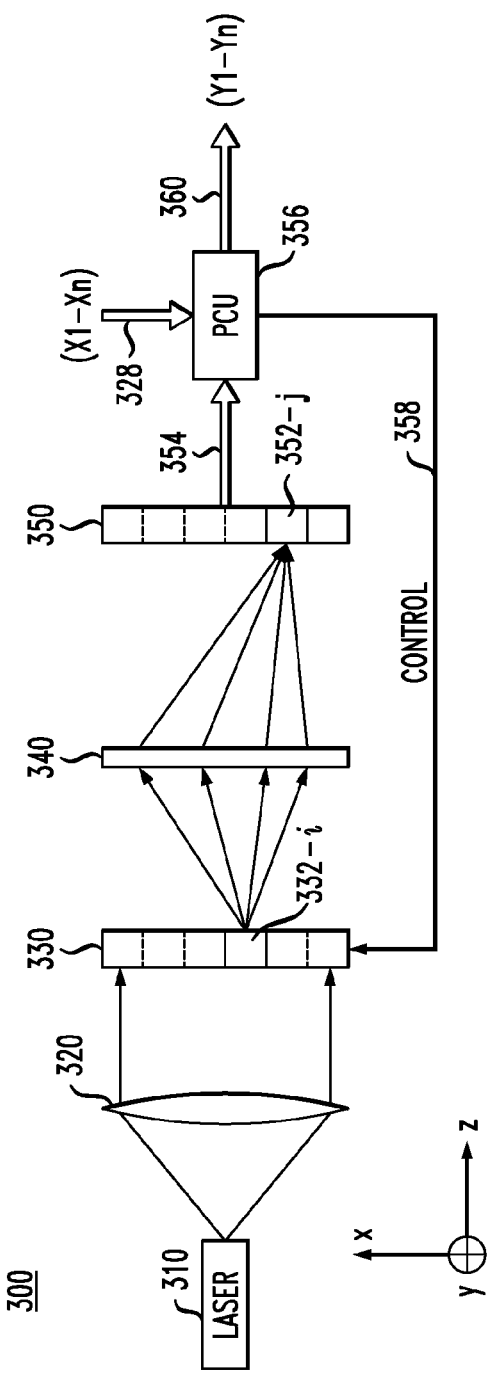
FIGS. 3A-B schematically show an optical processor that can be used to emulate an artificial neural network (ANN) according to one embodiment of the invention.
Figure 3B:
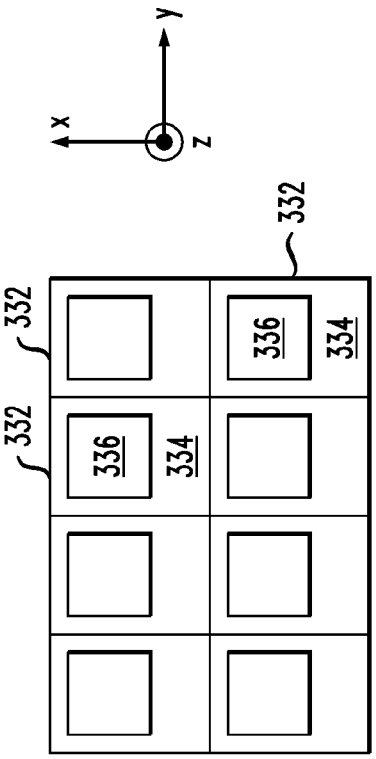

FIGS. 3A-B schematically show an optical processor 300 that can be used to emulate an artificial neural network (ANN) having two or more artificial neurons according to one embodiment of the invention. More specifically, FIG. 3A shows a side view of processor 300, and FIG. 3B shows a front view of a spatial light modulator (SLM) 330 used in processor 300. In this subsection, only the basic functions of hardware elements of processor 300 are described. Subsequent subsections describe in more detail how processor 300 can be configured to emulate a particular ANN.

Processor 300 has a laser 310 configured to generate a beam of pulsed light, which, after being collimated by a lens 320, impinges upon SLM 330. Laser 310 is pulsed at a processing rate of processor 300, which is determined by (i) the transit time of light between the laser and a two-dimensional photodetector array 350 and (ii) the response time of the electronic circuits in the photodetector array, a processing and control unit (PCU) 356, and SLM 330. SLM 330 has a two-dimensional array of pixels 332, only eight of which are shown for clarity in FIG. 3B. In one embodiment, SLM 330 has a size of 1000×1000 pixels 332, for a total of $10^6$ pixels.

Each pixel 332 has a window 336 composed of an electro-optic material whose transparency is controlled by a control circuit 334 located in the pixel next to the window. Based on a control signal 358 received from PCU 356, each circuit 334 can cause the respective window 336 to be transparent for passing through the light impinging onto that window or to be opaque for blocking the light. Thus, SLM 330 effectively creates a plurality of individually controlled light sources, each of which can be turned on or off based on signal 358.

Each window 336 has a relatively small size causing it to transform a portion of the collimated beam from lens 320 impinging onto the window into a diverging beam as shown (not to scale) for pixel 332-$i$ in FIG. 3A. The degree of divergence can be controlled by choosing appropriate dimensions for window 336 when SLM 330 is manufactured. More specifically, a relatively large (compared to the wavelength of laser 310) window 336 will substantially preserve beam collimation. In contrast, window 336 having dimensions comparable to the wavelength of laser 310 or smaller will cause a relatively large degree of divergence. In an extreme case, a very small window 336 can substantially serve as a point light source. The degree of divergence produced by window 336 and the distance between the plane of SLM 330 and the plane of an optical transmission mask 340 define the area of the mask illuminated by each particular pixel 332 or by a group of such pixels. Thus, by appropriately selecting the window dimensions and the distance between SLM 330 and mask 340, different groups of pixels 332 can be configured to illuminate different areas of the mask.

Light transmitted by SLM 330 is spatially modulated by mask 340 before it reaches photodetector array 350. In one embodiment, mask 340 is a hologram, which, when illuminated, creates an interference pattern on the surface of photodetector array 350. The created interference pattern depends on the illumination pattern created by SLM 330 at mask 340 and on the spatial modulation pattern introduced by the mask. Typically, the interference pattern has areas of constructive and destructive interference, which can be spatially resolved using individual photodetectors 352 of array 350. In one embodiment, SLM 330 and photodetector array 350 have the same number of pixels 332 and photodetectors 352, respectively.

In a representative configuration, processor 300 operates as follows. Using control signal 358, PCU 356 configures SLM 330 to have a selected transmission pattern defined by the transparent windows 336 of pixels 332. This transmission pattern can be selected based on either an input signal 328 applied to processor 300 by an external data source or an output signal 354 of array 350. Signal 328 is typically used for supplying input data for processing by the ANN being emulated by processor 300, whereas signal 354 is used for effecting recursive signal propagation through successive layers of the ANN. Further details on the use of signals 328 and 354 in the context of emulating a particular ANN are given in the next subsections.

A pulse of light generated by laser 310 is first spatially modulated by the transmission pattern of SLM 330 and then further spatially modulated by mask 340 to create a corresponding interference pattern at photodetector array 350. The interference pattern is spatially resolved using photodetectors 352, which provide their measured light intensities, via output signal 354, to PCU 356. Based on signal 354, PCU 356 generates control signal 358 and/or an output signal 360. More specifically, for the first (i.e., input) ANN layer, PCU 356 uses signal 328 to generate control signal 358 to configure SLM 330. If signal 354 corresponds to an ANN layer other than an output layer, then PCU 356 uses the intensities received via signal 354 to reconfigure SLM 330 for the next laser pulse. If signal 354 corresponds to an output layer of the ANN, then PCU 356 uses the intensities received via signal 354 for generating an output signal 360, which represents the result of processing by the ANN the input data supplied by signal 328. As described in more detail below, processor 300 generally takes N−1 laser pulses to complete the processing of the input data, where N is the number of layers in the ANN being emulated by the processor.

Artificial Neural Network

Figure 1:
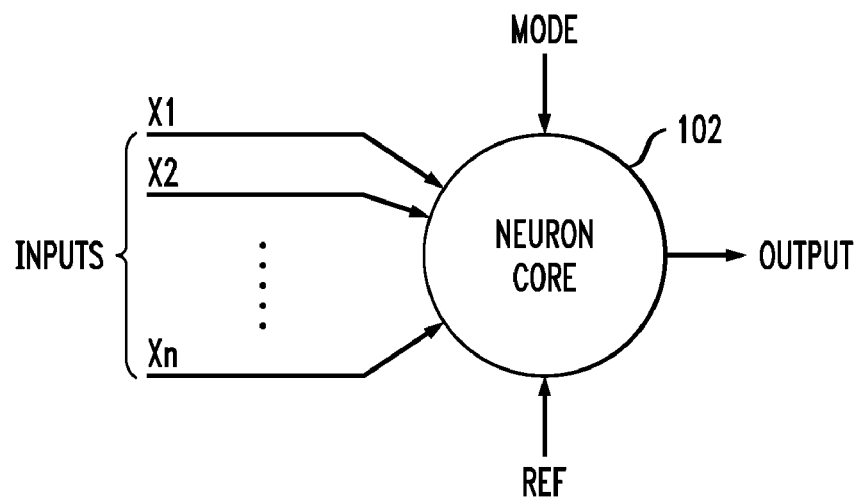
FIG. 1 schematically shows a simple artificial neuron (SAN) of the prior art.
Figure 2:
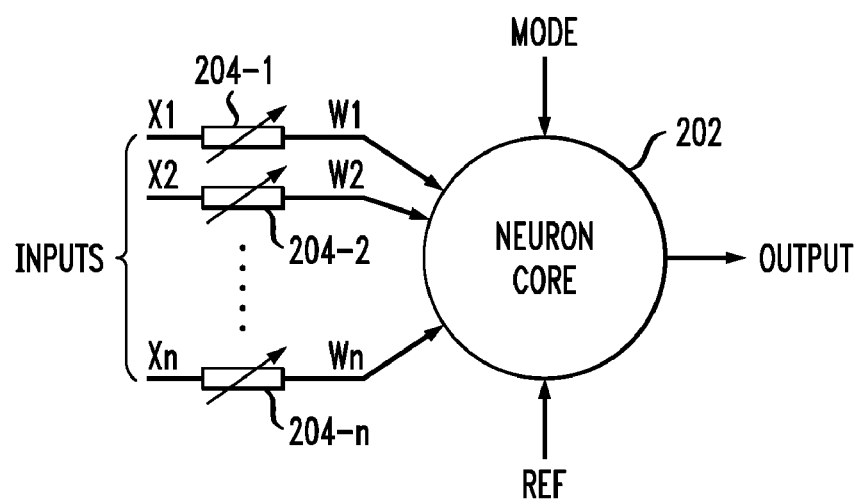
FIG. 2 schematically shows a McCulloch-Pitts artificial neuron (MCPAN) of the prior art.
Figure 4:
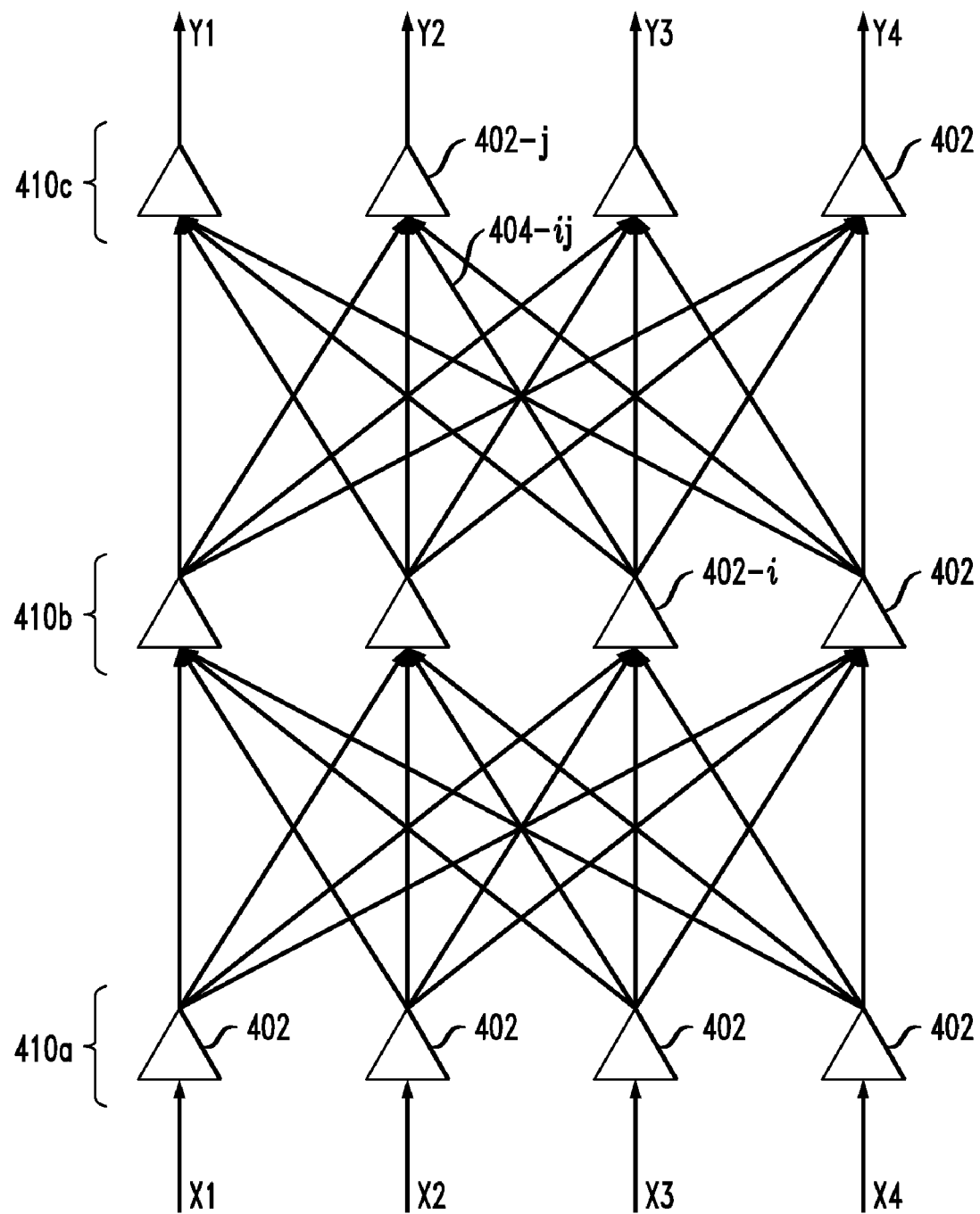
FIG. 4 shows a schematic diagram of a representative ANN that can be emulated using the optical processor of FIG. 3.

FIG. 4 shows a schematic diagram of a representative ANN 400 that can be emulated by optical processor 300 of FIG. 3. For illustration purposes, ANN 400 is shown as having three layers 410a-c of artificial neurons 402, with each layer having four artificial neurons, each of which is generally analogous to MCPAN 200 of FIG. 2. One skilled in the art will appreciate that an ANN having a different connection topology, a different number of layers, and/or a different number of artificial neurons in each layer can also be emulated by processor 300.

For the purposes of this description, it is assumed first that ANN 400 has been designed and trained, e.g., as known in the art, prior to being emulated by optical processor 300. This means that, for each artificial neuron 402 in ANN 400, the weights (see Eq. (1)) applied to the neuron's input signals are known and set. Note that each artificial neuron 402 in ANN 400 uses its own set of weights $W_{ij}$, which are independent of the weights used by other artificial neurons in the ANN. At the end of the next subsection, the use of certain embodiments of optical processor 300 for training ANN 400, i.e., determining the weights used by each artificial neuron 402, is outlined.

Layer 410a is an input layer of ANN 400, in which each artificial neuron 402 receives a respective input signal Xi, where i=1, . . . 4. Each artificial neuron 402 of layer 410a is connected to each artificial neuron 402 of layer 410b as indicated by the arrows in FIG. 4, with different arrows originating from the same artificial neuron representing different copies of a single output signal (analogous to the output signal of MCPAN 200 in FIG. 2) generated by that artificial neuron. Layer 410b is an intermediate (or hidden) layer, in which each artificial neuron 402 receives four input signals. Each artificial neuron 402 of layer 410b processes the received input signals in accordance with Eq. (1) and, based on the processing results, generates a corresponding output signal, with each artificial neuron 402 of layer 410c receiving a copy of that output signal. Each artificial neuron 402 of layer 410c similarly processes the received input signals in accordance with Eq. (1) and, based on the processing results, generates a corresponding output signal Yi, where i=1, . . . 4. Signals Yi are then output from ANN 400 for external use.

Emulating Artificial Neural Network with Optical Processor

Referring now to both FIGS. 3 and 4, electric field $E_{ij}$ at photodetector 352-$j$ produced by the light passing through the window of pixel 332-$i$ can be expressed using Eqs. (2a-c) as follows:

$$\frac{E_{ij}}{E_{(0)}^{(i)}} = \int\int s_i^{1/2}(x,y)\exp\left[-\frac{2\pi i}{\lambda}(r_i(x,y)+r_j(x,y))\right]T(x,y)dxdy \quad (2a)$$

$$r_i(x,y) = \sqrt{l_1^2 + (x-x_i)^2 + (y-y_i)^2} \quad (2b)$$

$$r_j(x,y) = \sqrt{l_2^2 + (x-x_j)^2 + (y-y_j)^2} \quad (2c)$$

where $E_0^{(i)}$ is the electric field at pixel 332-$i$; x and y are the coordinates in a plane orthogonal to the plane of FIG. 3A; $l_1$ is the distance between SLM 330 and mask 340; $l_2$ is the distance between mask 340 and array 350; $s_i(x,y)$ is the normalized intensity distribution created at the surface of mask 340 by the light passing through the window of pixel 332-$i$; $x_i$ and $y_i$ are the coordinates of pixel 332-$i$; $x_j$ and $y_j$ are the coordinates of photodetector 352-$j$; T(x,y) is a complex function describing the spatial modulation pattern imposed by mask 340; and $\lambda$ is the wavelength of light. Analogizing electric field $E_0^{(i)}$ at pixel 332-$i$ (FIG. 3) to the output signal of artificial neuron 402-$i$ (FIG. 4) and electric field $E_{ij}$ at photodetector 352-$j$ (FIG. 3) to a weighted input signal 404-$ij$ (FIG. 4), one finds that the right part of Eq. (2a) gives a representation in processor 300 of the weight $W_{ij}$ applied by artificial neuron 402-$j$ to the output signal of artificial neuron 402-$i$ (see FIG. 4). Then, the total electric field, $E^{(j)}_{total}$, at photodetector 352-$j$ is given by Eq. (3) as follows:

$$E^{(j)}_{total} = \sum_i W_{ij} E_0^{(i)} \quad (3)$$

where $W_{ij}$ is expressed by the right part of Eq. (2a) and the sum is taken over a set of pixels 332-$i$ contributing to the electric field at photodetector 352-$j$. Comparison of Eqs. (1) and (3) now reveals an analogy between the values of σ and $E^{(j)}_{total}$. More specifically, by measuring the light intensity, $|E_{total}^{(j)}|^2$, at photodetector 352-$j$ and comparing the measurement result with the corresponding threshold value, processor 300 can determine whether artificial neuron 402-$j$ is supposed to fire or not. Based on this analogy, SLM 330, mask 340, and array 350 in processor 300 can be configured, as further detailed below, to emulate signal coupling between two successive layers 410 of ANN 400.

Illustratively, only a description of an emulation by processor 300 of signal coupling between layers 410a and 410b is given below. One skilled in the art will appreciate that processor 300 can similarly be used to implement signal coupling between layers 410b and 410c. Generally, in a processing cycle having one laser pulse emitted by laser 310, processor 300 can emulate signal coupling in a layer pair having one signal-sending layer and one signal-receiving layer. As such, processor 300 can emulate signal propagation in ANN 400 in just two processing cycles, the first processing cycle emulating the signal coupling between layers 410a-b, and the second processing cycle emulating the signal coupling between layers 410b-c.

First, layer 410a is mapped onto a (first) selected section of SLM 330, with each pixel in the first section representing the respective artificial neuron 402 of that layer. Assuming that windows 336 of pixels 332 outside the first section are opaque, one can analogize an act of transmitting a laser pulse by a pixel in the first section to an act of firing the output of the corresponding artificial neuron 402 in layer 410a. Similarly, blocking the laser pulse in a pixel of the first section is analogous to not firing the output of the corresponding artificial neuron. Thus, assuming that the putative outputs of artificial neurons 402 in layer 410a are known, PCU 356 can configure pixels 332 in the first section of SLM 330 to have appropriately transparent or opaque windows 336.

Further assuming for a moment that all windows 336 in pixels 332 in the first section of SLM 330 are transparent, one finds that illumination of the first section of SLM 330 by laser 310 creates a corresponding (first) illuminated area at the surface of mask 340. This first area of mask 340 has encoded therein (as further detailed below) the weights applied by artificial neurons 402 of layer 410b to the output signals of artificial neurons 402 of layer 410a. Since there are sixteen interlayer signals between layers 410a-b, the holographic pattern in the first area of mask 340 encodes sixteen weights.

After traversing the first area of mask 340, the light transmitted by pixels 332 of the first section of SLM 330 creates a corresponding (first) illuminated area at the surface of array 350. Four photodetectors 352 in this first area of array 350 are selected to represent four artificial neurons 402 of layer 410b. Each of those photodetectors 352 can be used to determine whether the respective artificial neuron 402 is supposed to fire or not as already outlined above in the context of Eq. (3). Note that, despite the fact that the first area of array 350 might contain more than four photodetectors 352 (due to the above-described light divergence induced in pixels 332), the spatial modulation pattern imposed by the first area of mask 340 unequivocally defines which four photodetectors 352 in the first area of the array are selected to represent the four artificial neurons 402 of layer 410b.

In view of the foregoing, the relationship between (I) a signal-sending layer 410 (e.g., layer 410a) and the corresponding signal-receiving layer 410 (e.g., layer 410b) of ANN 400 and (II) pixels 332 in the section of SLM 330 representing the signal-sending layer and photodetectors 352 in the section of array 350 representing the signal-receiving layer can be summarized as follows. Each of those pixels 332 emulates an output portion of the respective artificial neuron 402 of the signal-sending layer 410. If a particular artificial neuron 402 of the signal-sending layer 410 is supposed to fire, then the respective pixel 332 of SLM 330 is configured to have its window 336 transparent. Alternatively, if that artificial neuron 402 is not supposed to fire, then the respective pixel 332 is configured to have its window 336 opaque. Similarly, each of those photodetectors 352 emulates an input portion of the respective artificial neuron 402 of the signal-receiving layer 410. Based on the light intensity detected by photodetector 352, the putative output of the respective artificial neuron 402 in the signal-receiving layer 410 can be ascertained. More specifically, if the detected light intensity matches or exceeds the intensity value representing the threshold value for the respective artificial neuron 402, then it is concluded that that artificial neuron is supposed to fire. Alternatively, if the detected light intensity is below the intensity value representing the threshold value for the respective artificial neuron 402, then it is concluded that that artificial neuron is not supposed to fire.

Considering now the spatial modulation pattern, $T^{(A)}(x,y)$, of the area of mask 340 encoding the weights applied by artificial neurons 402 of the signal-receiving layer 410 to the output signals of the signal-sending layer 410, one notes that this spatial modulation pattern satisfies the following system of sixteen equations derived from Eqs. (3a-c):

$$W_{ij} = \int\int s_i^{1/2}(x,y)\exp\left[-\frac{2\pi i}{\lambda}(r_i(x,y)+r_j(x,y))\right]T^{(A)}(x,y)dxdy \quad (4)$$

where index i=1, ..., 4 denotes pixels 332 representing artificial neurons 402 of the signal-sending layer (e.g., layer 410a), an index j=1, ..., 4 denotes photodetectors 352 representing artificial neurons 402 of the signal-receiving layer (e.g., layer 410b). As already indicated above, each of weights $W_{ij}$ is a known value determined during the training phase of ANN 400. Since functions $s_i(x,y)$ and the exponential factors in System (4) are known from the geometry of processor 300, System (4) can be used to define spatial modulation pattern $T^{(A)}(x,y)$. More specifically, in one possible approach, System (4) is solved numerically with respect to $T^{(A)}(x,y)$. At least one solution for $T^{(A)}(x,y)$ exists because, although some of the energy that passes through a given element of the mask will be shared between adjacent photodetectors 352, the effect of sharing can be compensated for by appropriately setting the modulation pattern(s) in the non-shared elements of the mask. Such non-shared elements of the mask exist due to the discreteness of: (i) pixels 332 in SLM 300 expressed by the corresponding set of discrete coordinates $(x_i,y_i)$ and (ii) photodetectors 352 in array 350 also expressed by the corresponding set of discrete coordinates $(x_j,y_j)$ (see Eqs. (2b-c)). Furthermore, one skilled in the art will appreciate that there exist multiple functions $T^{(A)}(x,y)$ that satisfy System (4), provided that mask 340 can have sufficiently high spatial resolution. Also, having sufficiently high resolution enables mask 340 to encode more than sixteen weights in a selected area of the mask. Communication between non-adjacent neurons is implemented through emulation of multiple layers of the ANN, and/or by PCU 356.

Figure 5:
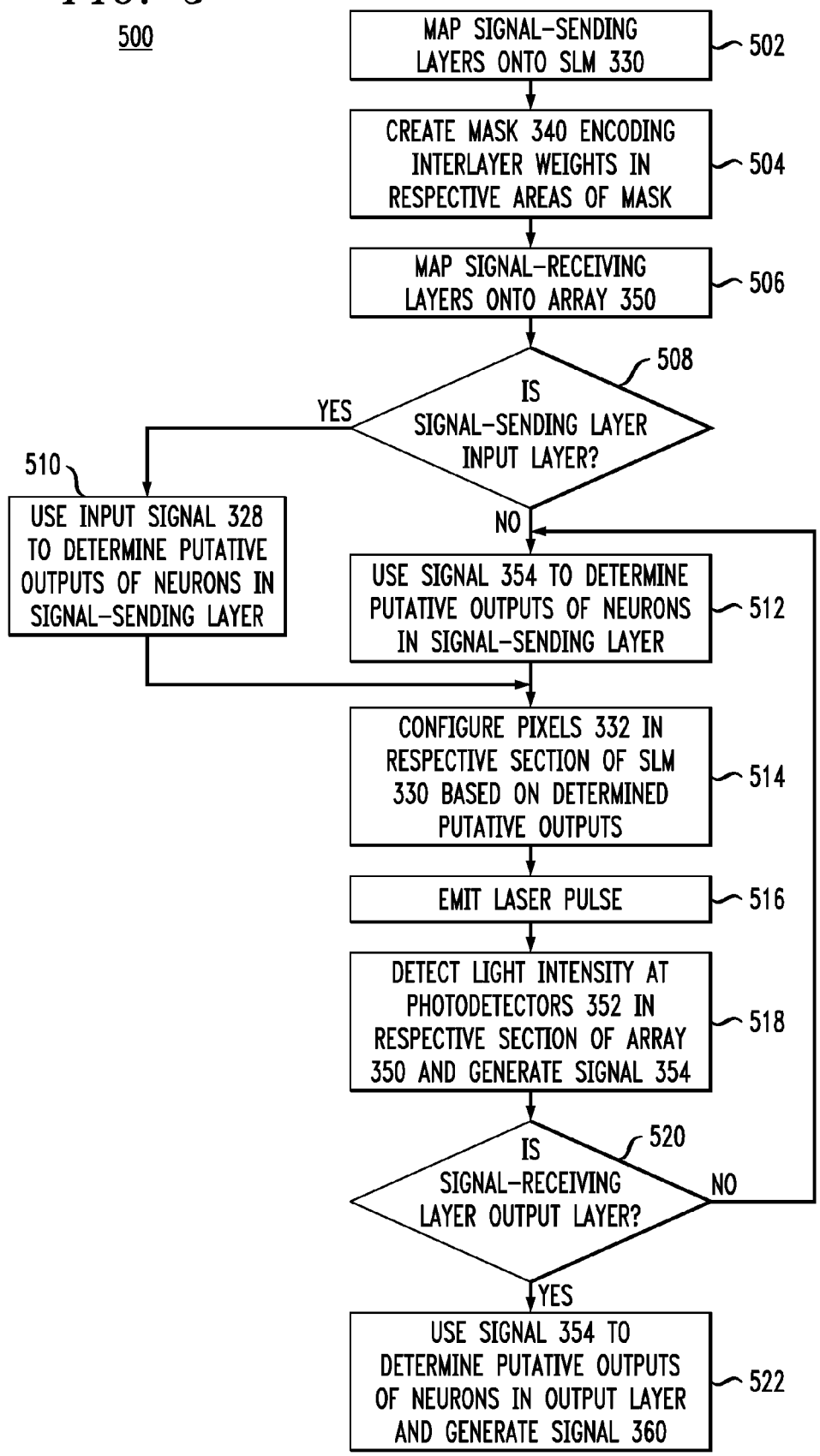
FIG. 5 shows a flowchart of a signal-processing method that can be used to emulate the ANN shown in FIG. 4 according to one embodiment of the invention.

FIG. 5 shows a flowchart of a signal-processing method 500 that can be used to emulate ANN 400 using processor 300 according to one embodiment of the invention. One skilled in the art will appreciate that method 500 can similarly be used to emulate an ANN having a different connection topology, a different number of layers, and/or a different number of artificial neurons in each layer than ANN 400.

In step 502 of method 500, pixels 332 of SLM 330 are logically partitioned into sections corresponding to different signal-sending layers of the ANN that is being implemented using processor 300. For example, ANN 400 has two signal-sending layers 410, i.e., layers 410a and 410b. Depending on the ANN topology and the properties of mask 340, SLM sections corresponding to different signal-sending layers of the ANN can be overlapping or non-overlapping.

In step 504, mask 340 is created to encode interlayer weights. More specifically, each area of the mask being illuminated by the light transmitted through a section of SLM 330 corresponding to a signal-sending layer has a hologram encoding the interlayer weights applied to the output signals of that signal-sending layer by the neurons of the corresponding signal-receiving layer. For example, in reference to ANN 400, System (4) can be used to define spatial modulation pattern $T^{(A)}(x,y)$ in each respective area of mask 340. Depending on the ANN topology and the SLM partition created in step 502, areas of mask 340 encoding the weights applied to different interlayer signals in the ANN can be overlapping or non-overlapping.

In step 506, photodetectors 352 of array 350 are logically partitioned into sections corresponding to different signal-receiving layers of the ANN being emulated using processor 300. For example, ANN 400 has two signal-receiving layers 410, i.e., layers 410b and 410c. Note that the logic partitioning of SLM 330 created in step 502 and the spatial modulation pattern of mask 340 created in step 504 substantially define the logic partitioning of array 350. Depending on the ANN topology, the logic partitioning of SLM 330, and the properties of mask 340, sections of array 350 corresponding to different signal-receiving layers of the ANN can be overlapping or non-overlapping.

After the completion of steps 502-506, processor 300 is ready for emulating the signal processing in the corresponding ANN by recursively determining the putative outputs of artificial neurons in each ANN layer on a layer-by-layer basis. More specifically, after step 506, the processing of method 500 is directed to step 508, where it is determined whether the signal-sending layer, the output signals of which are next to be emulated in processor 300, is an input layer of the ANN. For example, in ANN 400, layer 410a is an input layer. An input layer of the ANN differs from other ANN layers in that it receives its input signals from an external source (e.g., a different ANN or a data-sending device) as opposed to being received from the preceding ANN layer(s). If it is determined in step 508 that the signal-sending layer is an input layer (e.g., layer 410a in ANN 400), then the processing of method 500 is directed to step 510. Alternatively, if it is determined in step 508 that the signal-sending layer is an intermediate layer (e.g., layer 410b in ANN 400), then the processing of method 500 is directed to step 512.

In step 510, PCU 356 uses signal 328, which carries the input signals (X1-Xn) to be processed by the ANN (see also FIGS. 3 and 4), to determine the putative outputs of the neurons in the input layer. In one configuration, each of signals Xi is a binary signal, which is interpreted by PCU 356 as follows. If Xi=0, then the corresponding artificial neuron is not supposed to fire. Alternatively, if Xi=1, then the corresponding artificial neuron is supposed to fire. In another configuration, each of signals Xi is a multi-bit signal, which is interpreted by PCU 356 as follows. If Xi<Ti, where Ti is a threshold value for the corresponding neuron, then the neuron is not supposed to fire. Alternatively, if Xi≧Ti, then the corresponding neuron is supposed to fire.

In step 512, PCU 356 uses signal 354 to determine the putative outputs of the neurons in an intermediate signal-sending layer of the ANN. Recall that signal 354 carries the light intensities measured by photodetectors 352 of array 350, which represent the weighted inputs received by that intermediate layer from the preceding layer of the ANN. PCU 356 compares each of the received intensities with the intensity value representing the threshold value for the respective artificial neuron. If the received intensity value matches or exceeds the intensity value representing the threshold value for the respective artificial neuron, then it is concluded that that artificial neuron is supposed to fire. Alternatively, if the received intensity value is below the intensity value representing the threshold value for the respective artificial neuron, then it is concluded that that artificial neuron is not supposed to fire.

After the completion of either step 510 or step 512, the processing of method 500 is directed to step 514. Note that, at this point, for each neuron of the signal-sending layer (which could be an input layer or an intermediate layer), it has been determined whether the neuron is supposed to fire or not. Based on this information, PCU 356, via signal 358, configures pixels 332 in the section of SLM 330 corresponding to the neurons of the signal-sending layer to have appropriately transparent or opaque windows 336. PCU 356 also configures pixels 332 in all other sections of SLM 330 to have opaque windows 336.

After the completion of step 514, the processing of method 500 is directed to step 516, where laser 310 is instructed to emit a pulse of light. The pulse passes through transparent windows 336 and is blocked by opaque windows 336 of SLM 330, thereby emulating the firing pattern of the signal-sending layer. The passed light is modulated by spatial modulation pattern $T^{(A)}(x,y)$ of the corresponding area of mask 340 to create a corresponding interference pattern at array 350.

In step 518, which follows step 516, the interference pattern is spatially resolved using photodetectors 352 of array 350. In particular, photodetectors 352 of the array section corresponding to the ANN layer that receives signals from the signal-sending layer emulated in step 514 are used to detect light intensities, based on which the putative outputs of the neurons in the corresponding signal-receiving layer can be determined. For example, in reference to ANN 400 (FIG. 4), if the signal-sending layer emulated by SLM 330 in step 514 is layer 410a, then photodetectors 352 corresponding to (the signal-receiving) layer 410b are used to detect light intensities, based on which the putative outputs of neurons 402 in layer 410b can be determined. Similarly, if the signal-sending layer emulated by SLM 330 in step 514 is layer 410b, then photodetectors 352 corresponding to (the signal-receiving) layer 410c are used to detect light intensities, based on which the putative outputs of neurons 402 in layer 410c can be determined. The detected light intensities, which emulate the respective sums of weighted input signals for the signal-receiving layer, are provided, via signal 354, to PCU 356.

In step 520, it is determined whether the signal-receiving layer emulated in step 518 is an output layer of the ANN. For example, in ANN 400, layer 410c is an output layer. An output layer of the ANN differs from other ANN layers in that it applies its output signals to an external entity (e.g., a different ANN or a data-receiving device) as opposed to applying those signals to the subsequent ANN layer(s). If it is determined in step 520 that the signal-receiving layer is an output layer (e.g., layer 410c in ANN 400), then the processing of method 500 is directed to step 522. Alternatively, if it is determined in step 520 that the signal-receiving layer is an intermediate layer (e.g., layer 410b in ANN 400), then the processing of method 500 is directed back to step 512.

Returning the processing of method 500 to step 512 signifies the fact that the signal-receiving layer emulated in the previous instance of step 518 now becomes the signal sending layer to be emulated in the next instance of step 514. For example, in reference to ANN 400 (FIG. 4), layer 410b is first treated as a signal-receiving layer. Then, after the outputs of neurons 402 in layer 410b have been determined based on the signals received from layer 410*a*, layer 410*b* is treated as a signal-sending layer, which applies its output signals to the next signal-receiving layer, i.e., layer 410*c*. For emulating an ANN having several intermediate layers, the processing loop having steps 512-520 is repeated a number of times equal the number of such intermediate layers in the ANN. This repetition emulates recursive layer-by-layer signal propagation in the ANN.

In step 522, PCU 356 uses signal 354 to determine the putative outputs of the neurons in the output layer of the ANN. Step 522 is substantially similar to step 512, except that the determination of whether a particular artificial neuron is supposed to fire or not is now used to generate output signal 360 instead of control signal 358. Output signal 360 carries the output signals (Y1-Yn), which represent the final result of signal processing by the ANN being emulated by processor 300. In one configuration, each of signals Yi is a binary signal, which is interpreted as follows. If Yi=1, then it has been determined by processor 300 that the corresponding artificial neuron in the output layer of the ANN is supposed to fire. Alternatively, if Yi=0, then it has been determined that the corresponding artificial neuron is not supposed to fire.

In view of the above description, one skilled in the art will appreciate that ANNs having different topologies can be emulated by optical processor 300 configured to run method 500, e.g., by (1) appropriately logically partitioning SLM 330 and photodetector array 350 into sections representing different layers and topologic connections between those layers in the ANN, (2) appropriately encoding the respective interlayer weights using the corresponding appropriate areas of optical mask 340, and (3) recursively emulating signal propagation through the ANN layers. An alternative embodiment of processor 300 can employ a reconfigurable optical mask 340 instead of the above-described fixed optical mask. Such a reconfigurable optical mask can be based, e.g., on a programmable liquid-crystal panel. In this alternative embodiment, substantially the full area of both SLM 330 and photodetector array 350 become available for emulating signal coupling between each pair of communicating layers of the ANN. Because reconfigurable optical mask 340 can change its spatial modulation pattern on the fly, there is no need for encoding interlayer weights corresponding to different communicating layer pairs using different areas of the mask. Changing the spatial modulation pattern of a reconfigurable optical mask 340 for emulating connections between different communicating layer pairs is analogous to using different areas of a fixed optical mask 340 for different layer pairs.

The use of reconfigurable optical mask 340 might also be advantageous for carrying out an adaptation/training process for an ANN being emulated with processor 300. More specifically, as already indicated above, the adaptation/training process involves changing the weights of each artificial neuron until the ANN, as a whole, exhibits an optimal response to a collection of training input patterns. For example, in reference to ANN 400 (FIG. 4), various weights $W_{ij}$ (see Eq. (4)) are adjusted until output signals Y1-Y4 generated in response to training input signals X1-X4 match or reasonably approach the output signals expected from the ANN for those training input signals. In one embodiment of the invention, the training/adaptation process can be accomplished by executing method 500 several times, while changing the spatial modulation pattern of mask 340 in step 504 of each run of method 500 to adjust weights $W_{ij}$. This way, the spatial modulation pattern of mask 340 can be modified until processor 300 (and thus the ANN emulated thereby) exhibits an acceptable response to the training input patterns.

Additional Embodiments of Optical Processor

Figure 6:
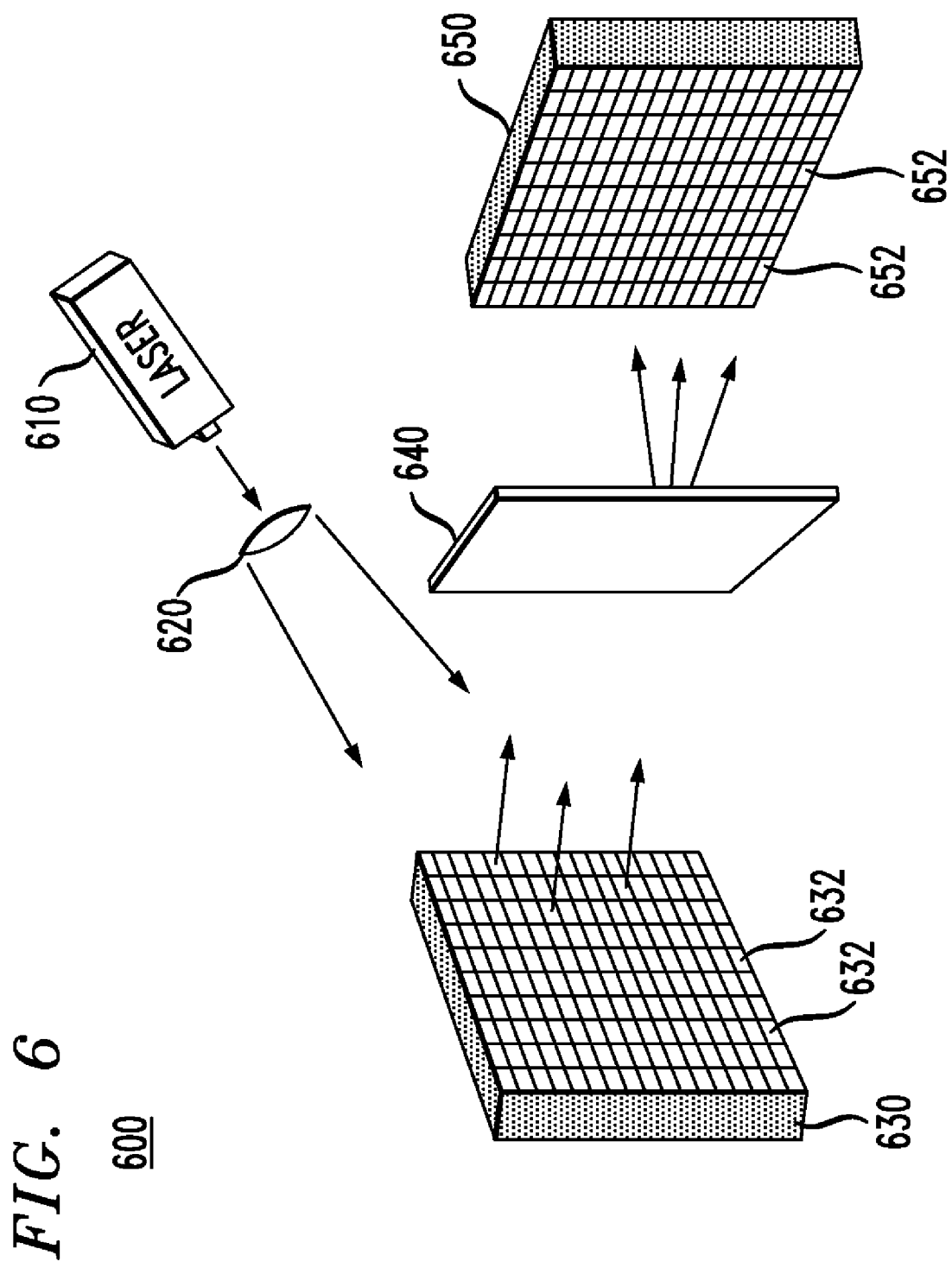
FIG. 6 schematically shows an optical processor that can be used to emulate an ANN according to another embodiment of the invention.

FIG. 6 schematically shows an optical processor 600 that can be used to emulate an ANN according to another embodiment of the invention. Processor 600 is generally analogous to processor 300 of FIG. 3, with the analogous elements of the two processors designated with labels having the same last two digits. However, one difference between processors 300 and 600 is that the latter has SLM 630 adapted to operate in reflection as opposed to SLM 330 operating in transmission in the former. In one embodiment, SLM 630 is a MEMS mirror array having a plurality of individually controllable mirrors. For each pixel 632 of SLM 630, having its mirror oriented so that it reflects light received from laser 610 toward optical mask 640 is analogous to having transparent window 336 in pixel 332 of SLM 330. Similarly, having the mirror of pixel 632 oriented so that it reflects light received from laser 610 away from optical mask 640 is analogous to having opaque window 336 in pixel 332. One skilled in the art will appreciate that processor 600 can be used to execute method 500 in a manner substantially analogous to that described above in reference to processor 300.

Figure 7A:
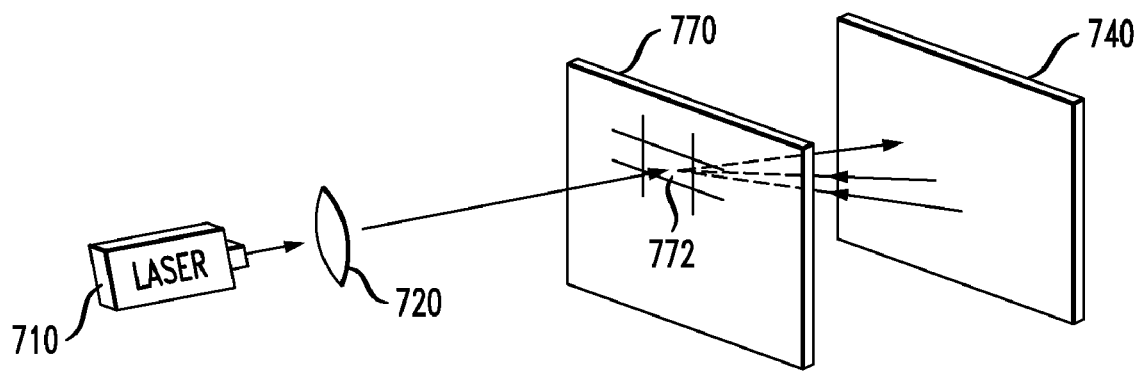
FIGS. 7A-B schematically show an optical processor that can be used to emulate an ANN according to yet another embodiment of the invention.
Figure 7B:
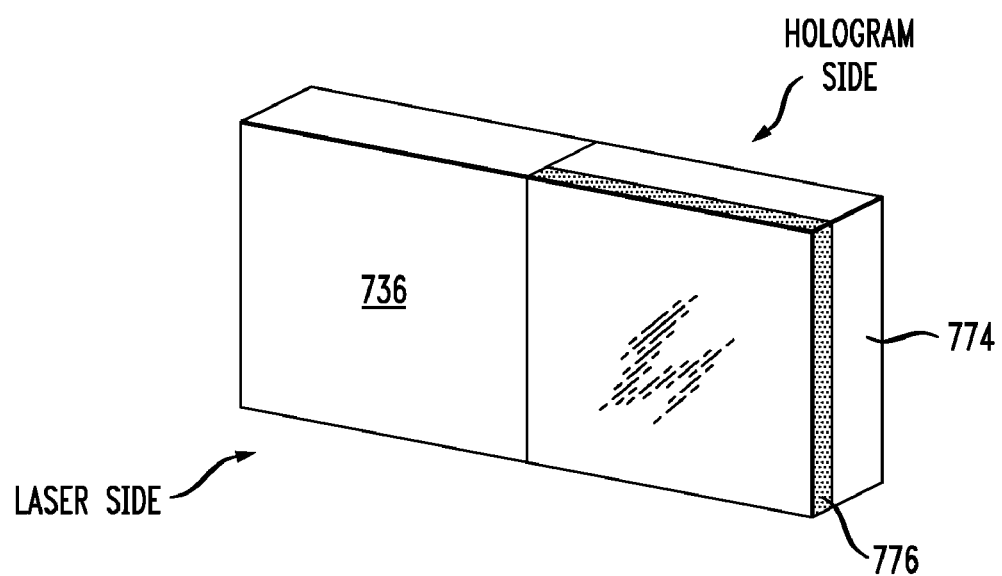

FIGS. 7A-B schematically show an optical processor 700 that can be used to emulate an ANN according to yet another embodiment of the invention. More specifically, FIG. 7A shows a schematic perspective view of processor 700, and FIG. 7B shows a schematic perspective view of one pixel 772 of an integrated SLM and photodetector array (ISLMPA) 770 used in processor 700. Processor 700 is generally functionally analogous to processor 300 of FIG. 3, with the analogous elements of the two processors designated with labels having the same last two digits. However, one difference between processors 300 and 700 is that the latter has ISLMPA 770, which integrates in a single chip the functions performed by SLM 330 and photodetector array 350 in the former. Another difference between processors 300 and 700 is that optical mask 740 in the latter is adapted to operate in reflection as opposed to optical mask 340, which operates in transmission in the former.

ISLMPA 770 has a plurality of pixels 772, one of which is shown in more detail in FIG. 7B. Pixel 772 has a window 736 that is analogous to window 336 of pixel 332 (see FIG. 3B). A portion 774 of pixel 772 has a control circuit (not explicitly shown in FIG. 7B) that is analogous to control circuit 334 of FIG. 3B. Similar to control circuit 334, the control circuit of portion 774 can cause window 736 to become transparent or opaque. In addition to the control circuit, portion 774 incorporates a photodetector (not explicitly shown in FIG. 7B) that is analogous to photodetector 352 of FIG. 3. Pixel 772 also has an optically opaque layer 776, whose purpose is to shield the photodetector from exposure to the light coming directly from laser 710, while leaving the photodetector exposed to the light reflected by optical mask 740. One skilled in the art will appreciate that processor 700 can be used to execute method 500 in a manner substantially analogous to that described above in reference to processor 300.

While this invention has been described with reference to illustrative embodiments, this description is not intended to be construed in a limiting sense. Although optical processors of the invention have been described in reference to artificial neural networks, they can also be used to implement Boolean logic functions, e.g., because optical mask 340 can be devised to encode one or more binary step functions used in Boolean logic. Although, in the description of method 500, it was specified for simplicity that windows 336 outside of the section of SLM 330 corresponding to the current signal-sending layer are opaque, those windows can be used for processing other information in parallel with the emulation of the current signal-sending layer, e.g., as in pipelined operation of a conventional processor. Various modifications of the described embodiments, as well as other embodiments of the invention, which are apparent to persons skilled in the art to which the invention pertains are deemed to lie within the principle and scope of the invention as expressed in the claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention.

I claim:

1. Apparatus, comprising:
a spatial light modulator (SLM) having a plurality of pixels, each pixel being configurable to direct or not to direct light toward a photodetector array;
an optical mask adapted to subject to spatial modulation the light directed by the SLM toward the photodetector array; and
the photodetector array adapted to measure an interference pattern produced by the spatially modulated light.

2. The invention of claim 1, further comprising a processing and control unit (PCU) adapted to:
configure the pixels of the SLM based on an externally generated input signal; and
reconfigure the pixels of the SLM based on measurement results produced by the photodetector array.

3. The invention of claim 2, wherein:
the apparatus is adapted to emulate an artificial neural network (ANN) having a plurality of interconnected layers, each layer having one or more artificial neurons;
each pixel is adapted to emulate an output portion of a corresponding artificial neuron of a signal-sending ANN layer by directing or not directing the light based on an output of said artificial neuron; and
each photodetector is adapted to emulate an input portion of a corresponding artificial neuron of a signal-receiving ANN layer by measuring light intensity produced by the interference pattern at said photodetector, wherein the PCU is adapted to compare the measured light intensity with a respective threshold value to determine an output for the artificial neuron whose input portion is being emulated by said photodetector.

4. The invention of claim 3, wherein:
the PCU is adapted to configure the pixels of the SLM and to process the measurement results of the photodetector array to emulate interlayer signal coupling in the ANN, wherein the apparatus is adapted to recursively emulate signal propagation through successive ANN layers to determine a final output of the ANN.

5. The invention of claim 3, wherein each pixel of the SLM comprises an optical window adapted to become either substantially transparent or substantially opaque based on the output of the artificial neuron whose output portion is being emulated by said pixel.

6. The invention of claim 3, wherein each pixel of the SLM comprises a movable mirror adapted to change orientation based on the output of the artificial neuron whose output portion is being emulated by said pixel.

7. The invention of claim 3, wherein the optical mask comprises a hologram that encodes weights corresponding to signal flow between one or more artificial neurons of the signal-sending ANN layer and one or more artificial neurons of the signal-receiving ANN layer.

8. The invention of claim 1, further comprising:
a laser optically coupled to the SLM and adapted to direct light via the SLM toward the photodetector array.

9. The invention of claim 1, wherein:
the optical mask is adapted to operate in reflection; and
the SLM and the photodetector array are integrated on a single chip.

10. A method of signal processing, comprising:
selectively directing light toward a photodetector array using a plurality of pixels in a spatial light modulator (SLM);
spatially modulating the light directed by the SLM toward the photodetector array using an optical mask; and
measuring an interference pattern produced by the spatially modulated light using the photodetector array.

11. The invention of claim 10, further comprising:
processing measurement results produced by the photodetector array to configure the pixels of the SLM.

12. The invention of claim 10, further comprising:
emulating an artificial neural network (ANN) having a plurality of interconnected layers, each layer having one or more artificial neurons, wherein:
each pixel is adapted to emulate an output portion of a corresponding artificial neuron of a signal-sending ANN layer by directing or not directing the light based on an output of said artificial neuron; and
each photodetector is adapted to emulate an input portion of a corresponding artificial neuron of a signal-receiving ANN layer by measuring light intensity produced by the interference pattern at said photodetector, wherein the PCU is adapted to compare the measured light intensity with a respective threshold value to determine an output for the artificial neuron whose input portion is being emulated by said photodetector.

13. The invention of claim 12, wherein the step of emulating comprises:
configuring the pixels of the SLM and processing the measurement results of the photodetector array to emulate interlayer signal coupling in the ANN; and
recursively emulating signal propagation through successive ANN layers to determine a final output of the ANN.

14. The invention of claim 12, wherein each pixel of the SLM comprises an optical window adapted to become either substantially transparent or substantially opaque based on the output of the artificial neuron whose output portion is being emulated by said pixel.

15. The invention of claim 12, wherein the optical mask comprises a hologram that encodes weights corresponding to signal flow between one or more artificial neurons of the signal-sending ANN layer and one or more artificial neurons of the signal-receiving ANN layer.

16. The invention of claim 15, wherein the step of emulating comprises:
repeating the steps of selectively directing, spatially modulating, and measuring to process one or more training input patterns for the ANN; and
changing the hologram to find optimal weights for one or more artificial neurons of the ANN based on the processing of said one or more training input patterns.

17. A method of emulating an artificial neural network (ANN) having a plurality of interconnected layers, each layer having one or more artificial neurons, the method comprising:
based on one or more outputs of one or more artificial neurons in a first selected layer of the ANN, configuring one or more pixels of a first selected section of a spatial light modulator (SLM) to direct or not to direct light toward a photodetector array;
subjecting the light directed toward the photodetector array by the one or more so configured pixels to spatial modulation using an optical mask; and
spatially resolving an interference pattern produced by the spatially modulated light at the photodetector array to determine one or more outputs of one or more artificial neurons in a next layer of the ANN.

18. The invention of claim 17, wherein:
the first selected layer is an input layer; and
the step of configuring comprises, for each artificial neuron of said input layer, comparing a respective input value with a respective threshold value to determine the output for said artificial neuron.

19. The invention of claim 17, wherein:
the next layer is an intermediate layer; and
for each artificial neuron of said intermediate layer, the step of spatially resolving comprises:
measuring light intensity at a photodetector corresponding to the artificial neuron; and
comparing the measured value with a respective threshold value to determine the output for the artificial neuron.

20. The invention of claim 19, further comprising:
repeating the steps of configuring and subjecting for said intermediate layer; and
repeating the step of spatially resolving for a layer following said intermediate layer.

* * * * *